US008528466B2

(12) United States Patent
Sweet et al.

(10) Patent No.: US 8,528,466 B2
(45) Date of Patent: Sep. 10, 2013

(54) LIQUID OVERFLOW PLATFORM AND CONTAINER FOR SMALL APPLIANCES

(76) Inventors: Bobbi J Sweet, Boise, ID (US); Jeff Graves, Boise, ID (US)

( * ) Notice: Subject to any disclaimer, the term of this patent is extended or adjusted under 35 U.S.C. 154(b) by 200 days.

(21) Appl. No.: 13/022,602

(22) Filed: Feb. 7, 2011

(65) Prior Publication Data
US 2012/0031278 A1    Feb. 9, 2012

Related U.S. Application Data (60) Provisional application No. 61/302,083, filed on Feb. 5, 2010.

(51) Int. Cl.
*A47J 31/44* (2006.01)
*B65D 1/34* (2006.01)

(52) U.S. Cl.
USPC .............. 99/290; 99/306; 99/275; 99/279; 99/307

(58) Field of Classification Search
USPC . 99/290, 275, 279, 307, 306; 211/41.3–41.6, 211/85.25; 220/57.2
See application file for complete search history.

(56) References Cited

U.S. PATENT DOCUMENTS

| 943,750 | A | * | 12/1909 | Leeking | 220/572 |
| 1,017,167 | A | * | 2/1912 | Pleins | 4/613 |
| 1,349,099 | A | * | 8/1920 | Redpath | 215/394 |
| 1,363,590 | A | * | 12/1920 | Hasskarl | 220/572 |
| 1,469,371 | A | * | 10/1923 | Abrams | 220/636 |
| 2,206,694 | A | * | 7/1940 | Greene | 47/71 |
| 2,781,651 | A |   | 2/1957 | Cutler | |
| 2,927,522 | A | * | 3/1960 | Rockwood et al. | 99/290 |
| 3,069,671 | A |   | 12/1962 | Taylor | |
| 3,517,603 | A | * | 6/1970 | Heifetz et al. | 99/283 |
| 3,606,617 | A | * | 9/1971 | Frazier | 4/613 |
| 3,800,335 | A |   | 4/1974 | Buonaura | |
| 4,054,184 | A |   | 10/1977 | Marcinko | |
| 4,392,552 | A |   | 7/1983 | Partridge | |
| 4,579,050 | A | * | 4/1986 | Niezen | 99/295 |
| 4,621,571 | A | * | 11/1986 | Roberts | 99/280 |
| 4,757,753 | A | * | 7/1988 | Pandolfi | 99/290 |
| 4,825,758 | A | * | 5/1989 | Snowball et al. | 99/282 |
| 4,838,178 | A |   | 6/1989 | Chriske et al. | |
| 4,895,250 | A |   | 1/1990 | Schifrin | |
| 4,930,632 | A |   | 6/1990 | Eckert et al. | |
| 5,007,557 | A |   | 4/1991 | Spence | |
| 5,020,667 | A |   | 6/1991 | Bush | |
| 5,036,976 | A |   | 8/1991 | Sechler et al. | |

(Continued)

*Primary Examiner* — Joseph M Pelham
*Assistant Examiner* — Jimmy Chou
(74) *Attorney, Agent, or Firm* — Pedersen and Company, PLLC; Barbara S. Pedersen; Ken J. Pedersen (57) ABSTRACT

The liquid-overflow platform and container device includes a generally horizontal platform for catching overflow liquid from a small appliance, such as a coffee maker, and a container attached beneath the platform that receives the liquid flowing through apertures in the platform. The apertures are less than 10% of the platform area. The platform may be topographically structured to encourage liquid to drain into the apertures, and is larger than the footprint of the appliance. The container is sized to contain more than the liquid capacity of the small appliance. The device is removable from beneath the appliance for carrying to an appropriate place to empty the contents, preferably by tipping the device to drain the liquid through platform corner apertures. The device may be separate from, and not connected to, the appliance, or may be sold as a connected but removable portion of the appliance.

12 Claims, 7 Drawing Sheets

(56) References Cited

U.S. PATENT DOCUMENTS

| | | | |
|---|---|---|---|
| 5,092,251 A | 3/1992 | Hamaker et al. | |
| 5,147,039 A | 9/1992 | Sechler et al. | |
| 5,249,699 A | 10/1993 | Williams | |
| 5,285,718 A * | 2/1994 | Webster et al. | 99/290 |
| 5,307,931 A | 5/1994 | Gillispie et al. | |
| 5,359,955 A | 11/1994 | Grebenyuk | |
| 5,392,911 A | 2/1995 | Gillispie et al. | |
| 5,429,236 A | 7/1995 | Evans | |
| 5,452,739 A | 9/1995 | Mustee et al. | |
| 5,562,047 A | 10/1996 | Forney et al. | |
| 5,611,262 A * | 3/1997 | Rizzuto et al. | 99/294 |
| 5,628,239 A * | 5/1997 | Wu | 99/290 |
| 5,813,318 A * | 9/1998 | Zanin et al. | 99/291 |
| 5,916,351 A * | 6/1999 | Sintchak | 99/284 |
| 5,979,646 A * | 11/1999 | Strachan | 206/217 |
| 6,123,010 A * | 9/2000 | Blackstone | 99/284 |
| 6,145,803 A * | 11/2000 | Emody et al. | 248/674 |
| 6,192,785 B1 * | 2/2001 | Trida et al. | 99/284 |
| D439,791 S * | 4/2001 | Vignao' | D7/322 |
| 6,240,830 B1 * | 6/2001 | Goldston | 99/279 |
| 6,298,769 B1 * | 10/2001 | Stettes et al. | 99/289 R |
| 6,381,901 B1 * | 5/2002 | Friedman | 47/79 |
| 6,595,107 B2 * | 7/2003 | Hart et al. | 99/290 |
| 6,769,538 B2 * | 8/2004 | Oswald | 206/77.1 |
| 6,792,847 B2 * | 9/2004 | Tobin et al. | 99/275 |
| 6,862,978 B1 * | 3/2005 | Fogagnolo | 99/279 |
| 7,013,794 B2 * | 3/2006 | Rolland | 99/284 |
| 7,051,646 B2 * | 5/2006 | Della Pietra et al. | 99/280 |
| 7,249,557 B2 * | 7/2007 | Fouquet | 99/300 |
| 7,357,071 B2 * | 4/2008 | Geroult et al. | 99/285 |
| 7,621,422 B2 * | 11/2009 | Reed et al. | 220/571 |
| 7,677,386 B1 * | 3/2010 | Kumar | 206/77.1 |
| 7,789,014 B2 * | 9/2010 | Fugger et al. | 99/323 |
| 7,886,653 B2 * | 2/2011 | Marconi | 99/290 |
| 7,926,413 B2 * | 4/2011 | Hart | 99/279 |
| 8,002,146 B2 * | 8/2011 | Cahen et al. | 222/108 |
| 8,247,010 B2 * | 8/2012 | Nguyen et al. | 426/433 |
| 8,250,972 B2 * | 8/2012 | Santoiemmo | 99/323.2 |
| 2001/0013524 A1 * | 8/2001 | Hart et al. | 222/146.5 |
| 2002/0029993 A1 * | 3/2002 | Wang | 206/546 |
| 2003/0037680 A1 * | 2/2003 | Rolland | 99/279 |
| 2003/0066431 A1 * | 4/2003 | Fanzutti et al. | 99/279 |
| 2003/0116025 A1 * | 6/2003 | Tobin | 99/279 |
| 2004/0065208 A1 * | 4/2004 | Hart et al. | 99/275 |
| 2004/0237795 A1 * | 12/2004 | Fouquet | 99/279 |
| 2004/0244599 A1 * | 12/2004 | Wei | 99/279 |
| 2005/0126400 A1 * | 6/2005 | Bragg et al. | 99/279 |
| 2005/0160917 A1 * | 7/2005 | Gantt et al. | 99/279 |
| 2005/0160918 A1 * | 7/2005 | Winstanley et al. | 99/279 |
| 2005/0193892 A1 * | 9/2005 | Rahn et al. | 99/279 |
| 2006/0011066 A1 * | 1/2006 | Bunn et al. | 99/279 |
| 2006/0016343 A1 * | 1/2006 | Tobin et al. | 99/275 |
| 2006/0060090 A1 * | 3/2006 | Gantt et al. | 99/279 |
| 2006/0112830 A1 * | 6/2006 | Pasquini | 99/275 |
| 2006/0150823 A1 * | 7/2006 | Thomas | 99/279 |
| 2006/0201329 A1 * | 9/2006 | Lynch | 99/275 |
| 2006/0266223 A1 * | 11/2006 | Hammad et al. | 99/279 |
| 2006/0266224 A1 * | 11/2006 | Hammad et al. | 99/279 |
| 2006/0266225 A1 * | 11/2006 | Hammad | 99/279 |
| 2006/0278090 A1 * | 12/2006 | Spisak | 99/275 |
| 2006/0283330 A1 * | 12/2006 | Lin | 99/279 |
| 2006/0283331 A1 * | 12/2006 | Lin | 99/279 |
| 2007/0000944 A1 * | 1/2007 | Cahen et al. | 222/108 |
| 2007/0039479 A1 * | 2/2007 | Dalton et al. | 99/279 |
| 2007/0051247 A1 * | 3/2007 | Felty | 99/279 |
| 2007/0062378 A1 * | 3/2007 | Glucksman et al. | 99/279 |
| 2007/0107604 A1 * | 5/2007 | Wei | 99/279 |
| 2007/0119308 A1 * | 5/2007 | Glucksman et al. | 99/275 |
| 2007/0157820 A1 * | 7/2007 | Bunn | 99/275 |
| 2007/0157821 A1 * | 7/2007 | Panesar et al. | 99/279 |
| 2007/0169633 A1 * | 7/2007 | Beesley et al. | 99/279 |
| 2007/0175334 A1 * | 8/2007 | Halliday et al. | 99/279 |
| 2007/0175337 A1 * | 8/2007 | Fedorchak et al. | 99/279 |
| 2007/0175338 A1 * | 8/2007 | Glucksman et al. | 99/279 |
| 2007/0193450 A1 * | 8/2007 | Magg et al. | 99/279 |
| 2007/0261563 A1 * | 11/2007 | Morin et al. | 99/279 |
| 2007/0266861 A1 * | 11/2007 | Hart | 99/279 |
| 2007/0283817 A1 * | 12/2007 | Fugger et al. | 99/290 |
| 2008/0000357 A1 * | 1/2008 | Yang et al. | 99/279 |
| 2008/0034977 A1 * | 2/2008 | Halle et al. | 99/323.3 |
| 2008/0041231 A1 * | 2/2008 | Beharry et al. | 99/279 |
| 2008/0148950 A1 * | 6/2008 | Cahen et al. | 99/275 |
| 2008/0148957 A1 * | 6/2008 | Zanetti | 99/295 |
| 2008/0179264 A1 * | 7/2008 | Abrams | 211/41.3 |
| 2009/0261108 A1 | 10/2009 | Steinberg | |
| 2009/0261109 A1 | 10/2009 | Mirza | |

* cited by examiner

LIQUID OVERFLOW PLATFORM AND CONTAINER FOR SMALL APPLIANCES

This application claims benefit of Provisional Application 61/302,083, filed Feb. 5, 2010, the disclosure of which is incorporated herein by this reference.

BACKGROUND OF THE INVENTION

Injury or damage or property often occurs when liquid overflows from a small appliance when it malfunctions. For example, when hot liquid overflows a coffee maker, due to coffee maker malfunction and/or due to user error when setting up or using a table-top coffee maker, the liquid often misses the interior of the carafe and flows over the counter, down the cabinet doors, into the lower cabinets, and onto the floors. Coffee makers often malfunction at home and at the office and at all hours of the day, especially in view of many coffee makers being programmable to start operation when the user is not present. The valve mechanism of many coffee makers, which is intended to stop flow when the carafe is removed for pouring of "a first cup", can often malfunction, especially if the carafe is not properly positioned. Therefore, the coffee grounds cone/tray often fills up with liquid and overflows.

This common occurrence can cause a variety of injuries to the user or other people in the vicinity, such as burns, slipping on wet surfaces, and electrical shock. Coffee maker or other small appliance malfunctions can cause water damage or damage by staining of valuable property and possessions, such as counter tops, grout, desks, cabinet doors, cabinet interiors, hardwood floors, carpeting, walls, irreplaceable items, and documents, etc. While coffee makers are the most common cause of such damage, water carafe or reservoir, or other hot or cold liquid-containing devices may also cause such damage, due to malfunction, breakage, or cracks in the device.

SUMMARY OF THE INVENTION

The invented liquid overflow platform and container device (also called "the container") comprises a horizontal upper platform with an attached or integral container beneath it. The platform consists of a surface with apertures in less than 10% of the platform area and is topographically structured to allow liquid to drain into the apertures and into the container. The container consists of a generally flat, horizontal base portion with sidewall structures that extend vertically upward from the base to define a liquid-retaining reservoir and to support the platform. Preferably, a lip surrounds the upper platform surface.

When the invented device is placed beneath a small appliance that operates by running liquid through it, such as a coffee maker or a drinking water filter carafe/reservoir, and when a malfunction occurs causing a substantial amount of liquid to overflow, the overflowing liquid is captured and contained. This is done by the liquid remaining on the upper platform surface until it drains into one or more of the upper platform apertures, which apertures are in fluid communication with the interior volume, or "interior reservoir" of the container.

The invented container may be removed from beneath the appliance and carried to an appropriate place to empty the contents. Depending on the amount of liquid overflow, the container may have a full interior reservoir or partially-full interior reservoir, but said container is effective and easy to empty in either situation. For example, the container sits beneath the coffee maker and collects the overflow, and preferably but not necessarily after it cools down, can be safely carried to the sink to empty. During carrying of the container and emptying, the preferred wall structure, depth of the container, and small amount of aperture surface area make spills and splashes unlikely.

By catching liquid before it reaches the countertop, cabinets, desk, floor, etc., the container saves injury, damage, and frustration. Because all of the liquid is typically captured by the container, and because it is so easy and safe to empty, the container solves the situation with very little clean-up effort.

Some embodiments of the invention may be provided with the small appliance at the point of sale, for example, connected by a latch or lock system to the base of the small appliance, but removable when the reservoir is due for emptying. This connection may be a slide-on, snap-on, pivot latch-on, slide-latch-on, or other connections. This way, the small appliance may be moved and used with the platform/container device attached, but said device may be removed without spilling and splashing when needed.

DETAILED DESCRIPTION OF THE PREFERRED EMBODIMENTS

The preferred platform and container device, for overflowing liquid from a small appliance, comprises a structurally-sound horizontal upper platform surface with some apertures for liquid flow into the interior reservoir of the device, but with said apertures being minimal. Preferably, the apertures represent (that is, cover or amount to) 1-10% percent of the upper surface area of the upper platform, and, more preferably, 2-7% of the upper surface area. This way, the platform surface is strong-enough to support a small appliance, and closed-enough at its top to prevent splashing and spills when the device is carried to a sink or other location for emptying, but the overflowing liquid still flows through said apertures instead of overflowing the device. A rim may be provided around the top edge of the device to help retain the liquid until it flows down through the apertures into the interior reservoir.

The preferred platform and container device ("container") comprises, beneath the upper platform, a generally or totally flat, horizontal base portion, sidewall(s) that extend(s) vertically upward from the base to define the liquid-retaining interior reservoir and to structurally support the upper platform. Overflowing liquids are captured and contained when placed beneath a type of small appliance that operates by running liquid through it, such as a coffee maker or countertop water filter device, and when a malfunction occurs causing a substantial amount of liquid to overflow, for example, as discussed in the Background section of this disclosure.

The reservoir must remain structurally-sound and liquid-tight when catching an overflow of extremely hot temperature liquid, and must hold more than the capacity of the appliance being used. The platform may or may not have a small vertical rim around the top to contain liquid from running over the top of the platform. However, preferably, and especially if a rim is not provided, the topography of the platform should allow for the liquid to drain toward the apertures in the surface and into the reservoir. A small amount of slanting of the surface may be allowed and/or small recesses in the upper platform that "direct" or "guide" the liquid to the apertures. The apertures should not have raised edges/lips, so that the majority of the upper platform surface is at the same level or slightly above the edges of the apertures, thus, encouraging or at least not hindering liquid flow into the interior reservoir.

Figure 3:
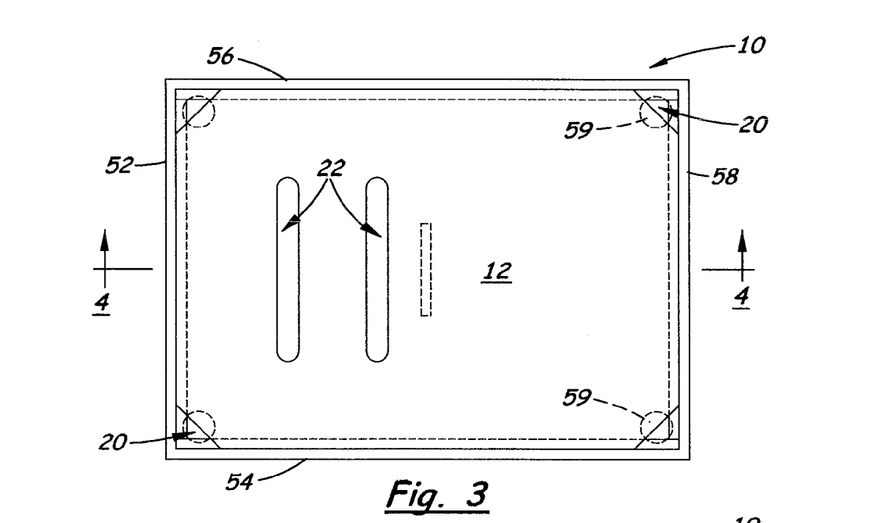
FIG. 3 is a top, view of the device of FIGS. 1 and 2, with the device rotated so the right side is facing downward to the bottom of the paper.
Figure 4:
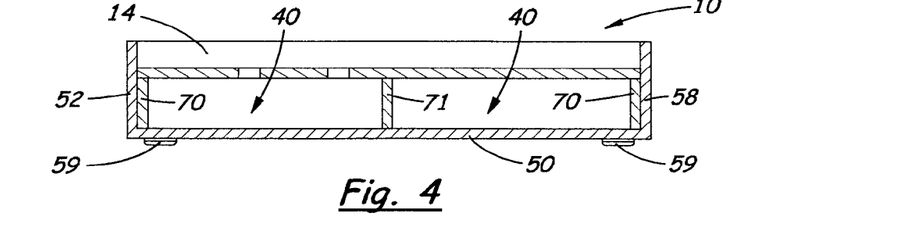
FIG. 4 is a right side, cross-sectional view of the device of FIGS. 1-3, viewed along the line 4-4 in FIG. 3.
Figure 5:
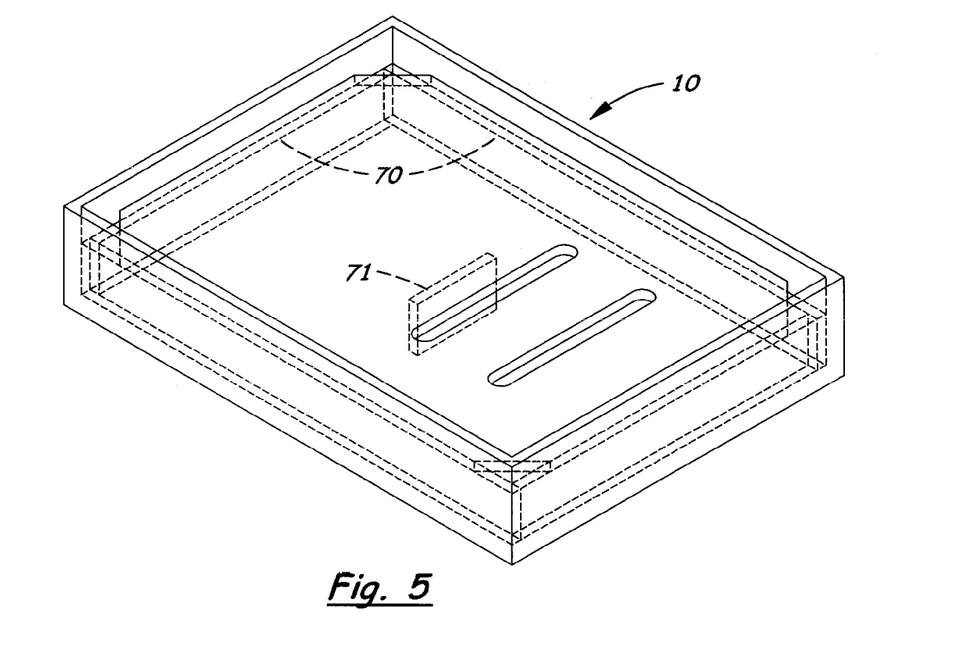
FIG. 5 is a front, top, perspective view of the device of FIGS. 1-4, with the interior walls shown in dashed lines.

Added structural support within interior reservoir may be needed to maintain the strength and integrity of the platform, especially with extremely hot liquids. For example, a vertical wall(s) or other supports for the upper platform, at or near the center region of the upper platform, may be used. These vertical walls/supports, however, should not be long or large enough to create baffles or barriers inside the interior reservoir that interfere with quick and smooth flow of liquid inside the interior reservoir, and preferably to the corner apertures, for emptying the reservoir. As shown in FIGS. 3 and 5, structural support 71 is at or near the center of the reservoir but does not extend to the sidewall 52, 54, 56, 58.

Materials to produce the platform and container device must have structural integrity to withstand extreme temperatures and remain structurally sound to withstand the weight of the appliance under high-temperature and wet conditions. The container may be made of manufactured or molded Plexiglas™, plastic(s), metal(s), or any material(s) that is capable of maintaining the needed integrity.

The upper platform may be integral with, permanently secured/fixed to the side walls of rim of the reservoir portion, and/or may be removable for cleaning of the interior of the container. Removable platforms, however, may require a latch, snap-in connection, slide-out connection, or other means to prevent the platform from sliding off or falling off/away from the reservoir when being used, carried and/or emptied. An important feature is the safety of use and emptying of the device, so it is preferred that said safety be paramount as opposed to quick cleaning of the interior reservoir. Soap and/or bleach may be poured through said apertures for soaking of the container, followed by draining of the container without opening the container. Other opening means may be used to clean the inside of the device, for example, several latches (not shown), which retain the upper platform over the reservoir, may be pivoted or snapped away from the upper platform to allow removal of the platform and exposure of the interior surfaces of the reservoir. Or, a removable but latchable "door" or other portion of the platform may be provided in the upper platform to allow better cleaning. Having a removable door/portion provided in the platform, or having the entire platform be removable would be preferable to having another portion of the container being openable or removable, as the latter option would make sealing the container more difficult, and the container would more likely leak potentially dangerously-hot fluid during overflow or carrying of the device. Therefore, the platform may be permanently secured/affixed to the reservoir, or removable but preferably latchable or lockable.

It is preferred that emptying of the container be done by retaining the platform in place (by permanent connection and/or latching or locking to the walls of the reservoir), and that the container be emptied by draining the liquid through one or more apertures in an appropriate place, such as a sink. The one or more apertures for draining liquid from the reservoir may be called "pour spout apertures". The preferred locations for said drain holes or "pour spout apertures" are at one or more corners of the platform and reservoir. This way, the device may be carried with a full or nearly-full reservoir to an appropriate place to empty the contents and the device is simply tilted to place a selected corner(s) lower than the main portion of the reservoir, and the liquid will drain out of the reservoir in a controlled and container manner through the corner hole(s). For example, two corners at the front or at the back may be excellent liquid capture holes during the overflow, and then may be excellent draining holes for emptying into the sink.

The footprint of the device must be larger than the footprint of the appliance to catch the overflow and the majority of splash. The container may have feet on the bottom to keep condensation and heat from touching the surface below to reduce damage to that surface. It may be noted that the small appliance will also typically have feet/pads on the appliance bottom surface, and this will provide room between the bottom surface of the appliance and the upper platform to allow the overflowing liquid to flow along the upper platform to the apertures. This way, even in embodiments wherein the appliance covers some or all of the apertures from the user's vision, the liquid will flow to the apertures. See, for example, FIGS. 1 and 2, wherein the slit-style apertures near the middle region of the upper platform are covered by the coffee maker. In this embodiment, it will be understood that the liquid may flow to said slit-style apertures, by flowing underneath the coffee maker, and/or to the corner apertures that are not underneath the coffee maker.

Sizes, shapes and colors may vary and the platform could be attached to the reservoir permanently as one unit, or removable/separate as discussed above. Added accessories could be added such as stacking components with a storage area or drawer to keep often used items such as filters, spoons, straws, sugar packets, etc. See, for example, FIG. 8, described in more detail below.

The platform and container device could also be incorporated into the design feature of the appliance, however, it is important that the platform and container device be large enough to contain the entire liquid contents of the appliance and that the container be closed enough to be safe during carrying and emptying. In prior art coffee and espresso makers having small trays with screened or slotted covers, the covers are substantially open (lots of slits or screen holes), and the covers easily allow spills and splashes if the appliance of the tray is carried. Also, said trays typically have such low volumes that they only can contain drips or small spills, typically at the front of the appliance only, but not the entire liquid contents of the appliance.

Figure 1:
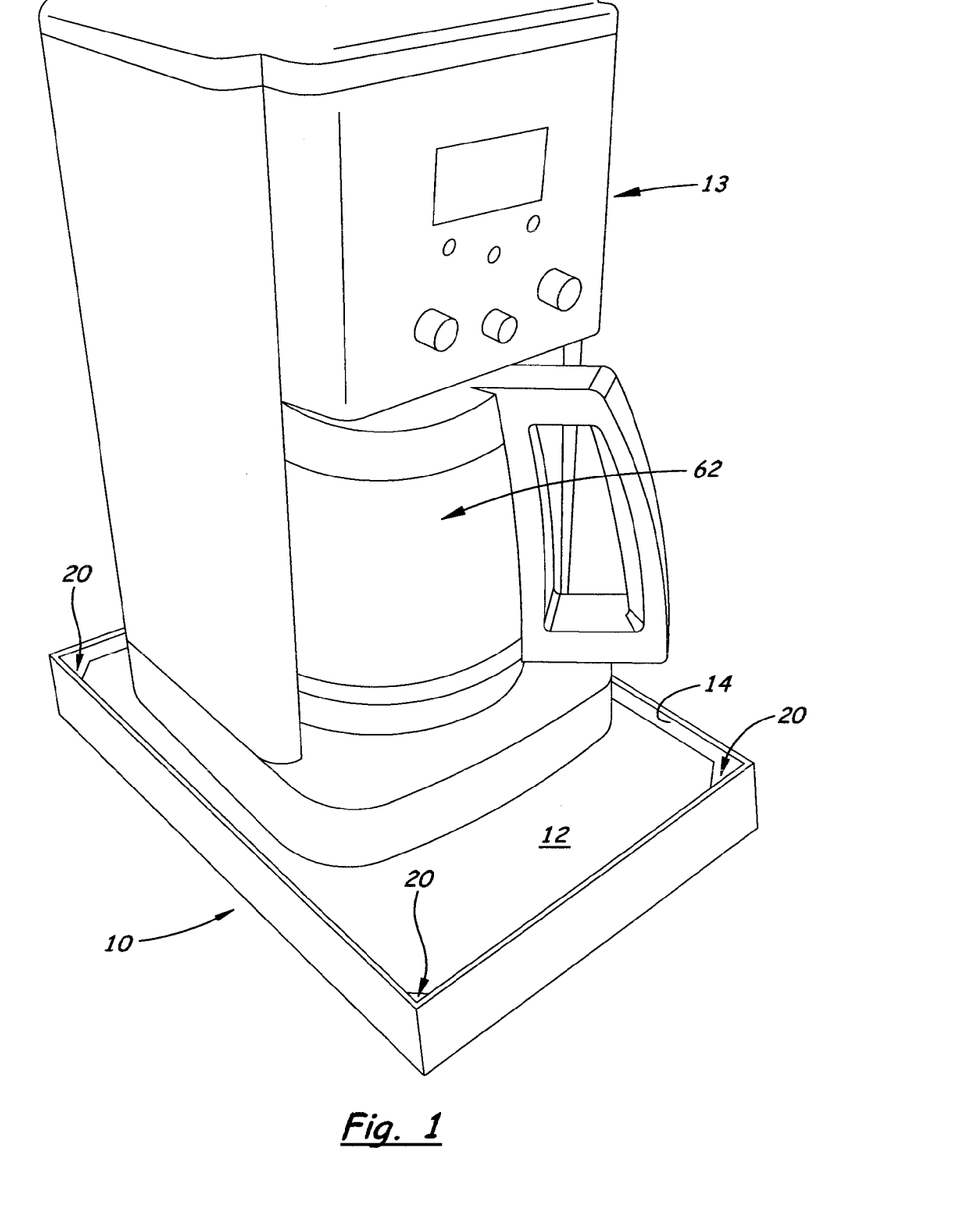
FIG. 1 is a front perspective view of an example coffee maker resting on top of one embodiment of the invented platform and container device, wherein the coffee maker is unattached to the platform and container device and may be easily lifted off of the device.
Figure 2:
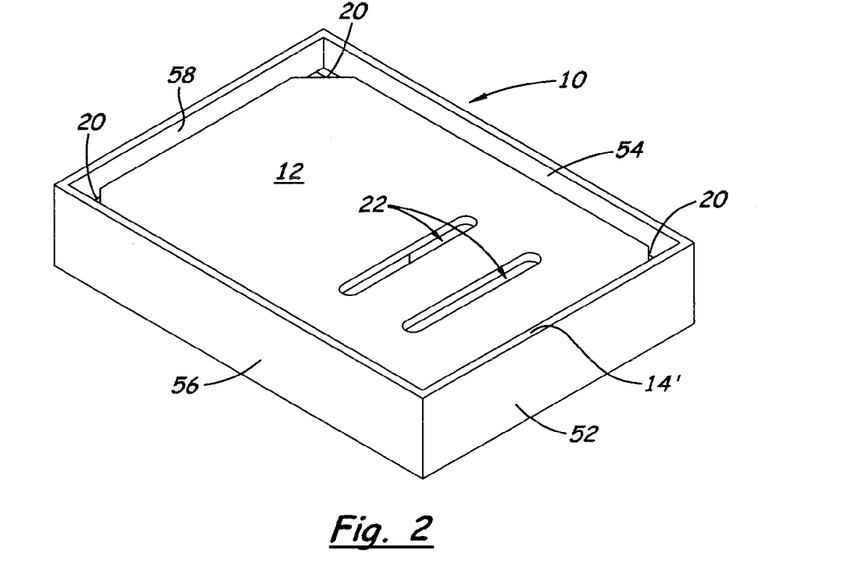
FIG. 2 is a front, top, perspective view of the platform and container device of FIG. 1, with the coffee maker removed, wherein one may see the slit-style apertures at or near the center region of the upper platform and the apertures at the corners of the upper platform.

Referring more specifically to the Figures, there is shown in FIG. 1 platform and container device 10, with its structurally-sound and generally horizontal upper platform 12 for supporting a small appliance 13. The platform 12 is a substantially-closed, substantially-solid surface containing minimal apertures. By substantially-closed, substantially-solid surface, it is meant that most of the platform surface is solid and continuous, without apertures. The platform 12 is preferably not a screen, mesh, grill, or otherwise majorly-perforated. Preferably, the platform 12 has less than 10% of its surface area being apertures, more preferably, 1-10%, and most preferably 2-7% of its surface area being apertures. Therefore, typically 90-99%, and more preferably 93-98% of the surface area within the preferred rim 14 is solid/continuous.

The apertures preferably comprise corner apertures 20 and central apertures 22. In the embodiment of FIG. 1-5, there are four corner apertures 20, that is, one in each corner of the rectangular device 10. There are two central apertures 22 that are slits in the platform in the front half of the platform 12, but distanced from the rim 14 front portion 14'. Platform 12 may be described, therefore, as a generally rectangular plate with its corners removed to form apertures 20, and with one or more elongated apertures at or near its center.

One or more of the apertures 20, 22 allow liquids to pass into the liquid tight interior reservoir 40, which is defined by walls forming a generally rectangular box of which the platform 12 is the top wall. Said walls comprise the top wall, which is platform 12), generally-flat (or preferably completely-flat) horizontal base 50 (bottom wall), and a sidewall comprising front wall 52, right wall 54, left wall 56 and rear wall 58. The sidewall (52, 54, 56, 58) extends vertically from the base 50 to define the liquid retaining space (reservoir 40), and structurally support the platform 12. The device 10 may have feet 59 on the bottom to keep condensation and heat from touching the surface below to reduce damage to that surface.

The reservoir must remain structurally sound and liquid-tight when catching the overflow of extremely hot temperatures, for example, and must hold more than the capacity of the appliance being used. Therefore, the preferred container 10 should hold in its reservoir 40 more than 6 cups, 8 cups, and 12 cups of liquid, for 6-cup, 8-cup, and 12-cup coffee makers, respectively. Most preferably, the container 10 holds in its reservoir 20-150 percent more liquid, and preferably 20-50 percent, than the maximum liquid capacity of the appliance during normal use.

Overflowing liquids from a coffee maker (small appliance 13), for example, those missing the intended carafe 62, flow onto the platform 12 and flow to and down through one or more of the apertures 20, 22, to be captured and contained in the reservoir 40. The preferred rim 14 extends vertically about ¼-½ inch above the top surface of the platform 12, to prevent overflow off the device 10, for example, if the device 10 is on an uneven surface or if the platform is so flat that some liquid runs to the edge of the device. Instead of, or in addition to the rim 14, the topography of the platform may allow for the liquid to drain toward at least some of the apertures or all the apertures, for example, by slightly concave top surface areas of the platform "leading downhill" to the apertures. A benefit of the corner apertures 20 is that, if the device 10 is on a slanted surface, the liquid will naturally flow to one or more corners. Also, the corner apertures 20 are pour spout apertures that are beneficial in that they are the preferred openings for emptying the reservoir at a sink, outside, or in another safe location. The user will tip the device 10 over said sink/location, to place one or more of the corners lower than the rest of the device and the liquid will flow out of said one or more corners, without the liquid flowing over any of, or a substantial amount of, the platform. Also, this way, the liquid will be very likely to not contact the user's fingers/hand; thus, cooling of the liquid before emptying is preferred but not necessarily required.

Added structural supports 70, 71 may be provided within the reservoir to maintain the strength and integrity of the platform, especially with extremely hot liquids. Supports 70, 71 are shown to best advantage in FIG. 4, where supports 70 are supplements to the sidewall and are therefore at or near the outer perimeter of the device. Supports 70 may be several inner support walls, or preferably a continuous inner wall, shorter than the outer sidewall, that upends adjacent to, and preferably touching and connected to, the sidewall. This way, the support(s) 70 provides extra structural integrity and the support(s) 70 top edge also serves as connection and/or liquid-seal means and support for the platform 12. Support 71 is located at or near the center of the reservoir 40. The platform 12 may also, or instead, be connected and/or liquid-sealed to the sidewall (walls 52, 54, 56, 58).

Materials to produce the device 10 must have structural integrity to withstand extreme temperatures and remain structurally sound to withstand the weight of the appliance under these conditions. The walls of the device, and/or the support 70 may be made of manufactured or molded Plexiglas™, plastic, metal, or any material(s) that is/are liquid-proof and capable of maintaining the needed integrity.

As shown in FIG. 1, the footprint of the device 10 should be larger than the footprint of the appliance to catch the overflow and the majority of the splash. Preferably, the footprint of the device 10 extends so that the top surface area of the entire device 10 is at least 20 percent larger (preferably 20-150 percent larger, and more preferably, 20-100 percent) than the outer perimeter of the appliance in its outer region. For example, if the coffee grounds cone extends farther than the carafe, it is preferred to have the device be 20 percent larger than footprint of the appliance as measured in a horizontal plane at the largest part of said coffee grounds cone region. In FIG. 1, the bottom base of the coffee maker appears to have the largest footprint of the coffee maker, so the device 10 is at least 20 percent larger in footprint than the coffee maker bottom base.

Figure 6:
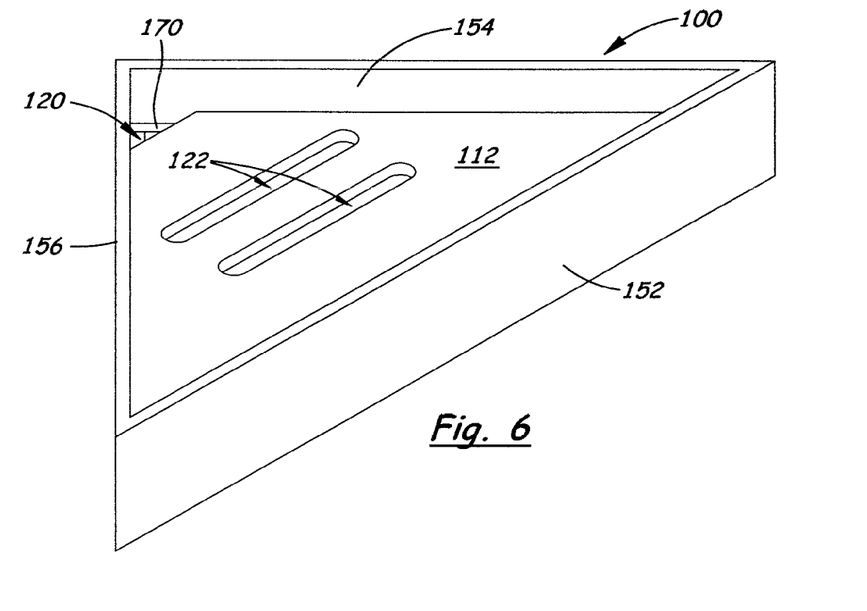
FIG. 6 is an alternative embodiment of the invented platform and container device, which is a triangular version for fitting into a corner space on a countertop, cabinet, or table.

FIG. 6 portrays an alternative embodiment of the container 100 that has a preferred, but not the only, alternative shape for the invented device. Triangular container 100 has a generally triangular platform 112, and a generally triangular sidewall comprising a front wall 152, a right wall 154, and a left wall 156. Support wall(s) 170 may be seen below the rear aperture 120 as a support member to hold up and/or connect and/or liquid-seal to the platform 112. In addition, or instead, the platform 112 may be connected to and/or liquid-sealed to the sidewall (152, 154, 156).

Container 100 has corner apertures 120 in preferably all three corners of the device (with only the rear one being visible in FIG. 6), for receiving overflowing liquid and/or for emptying the liquid as discussed above. Container 100 also has two generally-centrally-located slit apertures 122, which may receive overflowing liquid as discussed earlier in this document, and which may less preferably also be used for emptying liquid.

Figure 7:
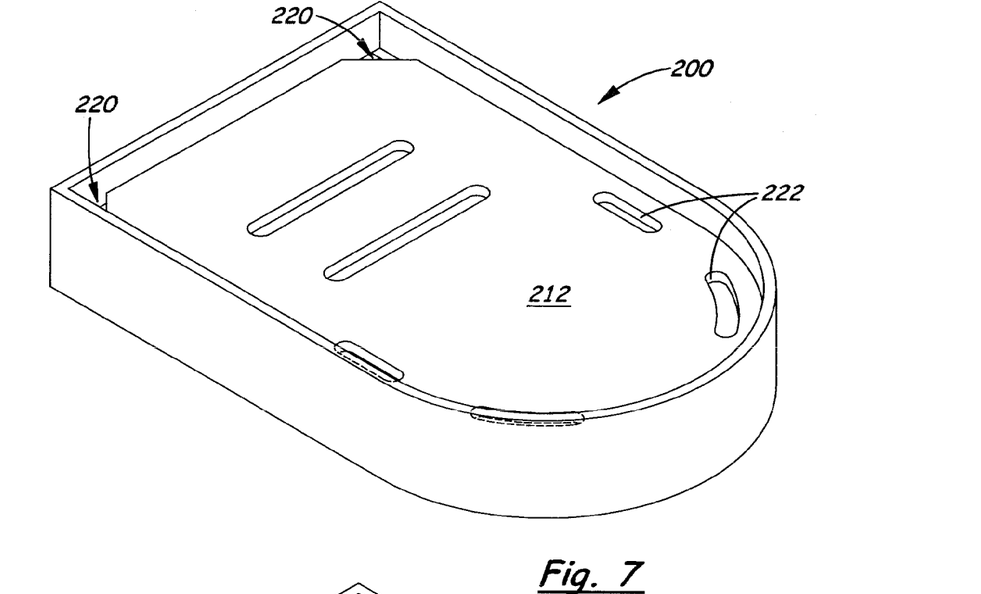
FIG. 7 is an alternative embodiment of the invented platform and container device, wherein the front wall of the device is curved.

FIG. 7 portrays an alternative embodiment of the container 200 that has another, but not the only, alternative shape for the invented device. Curved-front container 200 is has a rectangular rear portion, and a curved, generally-semi-circular front portion. Platform 212 is therefore rectangular at its rear (with two corners removed for liquid-receiving and/or -dispensing apertures 220) and a generally circular edge with multiple elongated, curved slit/slot apertures 222 for receiving and/or dispensing liquid. Platform 212 also has two optional parallel, elongated slit-style apertures (not numbered) at or near the center of the platform.

Figure 8:
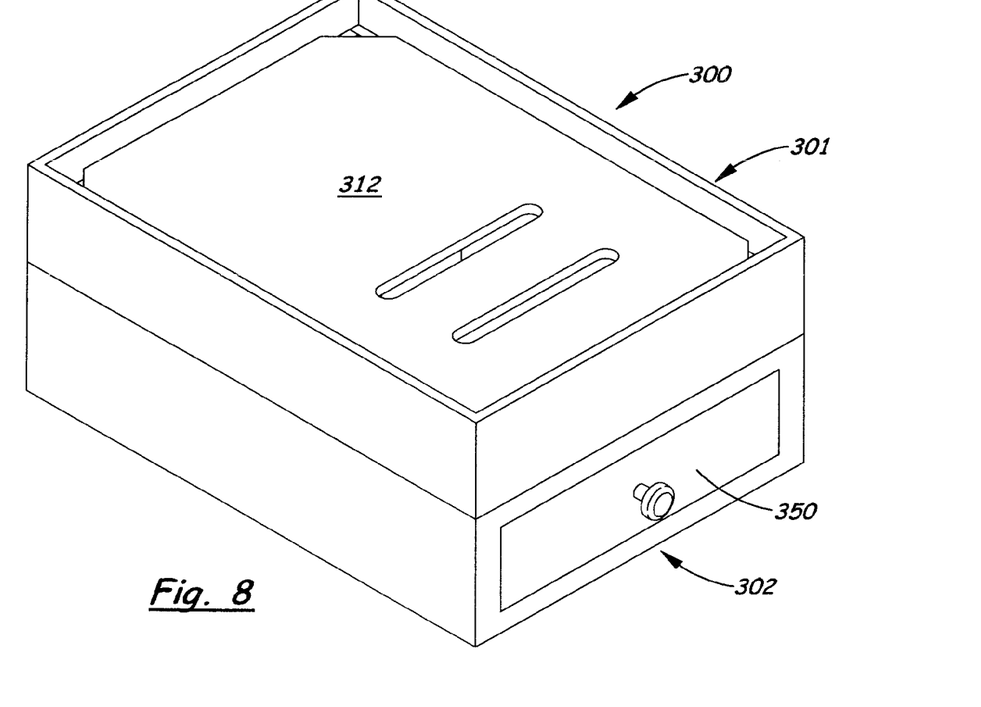
FIG. 8 is an alternative embodiment of the invented platform and container device, wherein a platform and container device such as the one shown in FIG. 1-5 is positioned atop a storage drawer unit.

FIG. 8 is a rectangular device 300 with an upper reservoir portion 301 and a lower drawer portion 302, in a stackable configuration. The upper reservoir portion 301, with its platform 312, is the same or similar to the device 10 shown in FIG. 1-5. Portion 301 is set on top of portion 302, preferably with some adaptation (not shown) of the sidewall and/or bottom wall of portion 301 to allow it to nest or mate with the lower portion 302, for the appearance and stability of a single unit. For example, the lower drawer portion 302 may have a slightly raised upper inner surface(s) that mate(s) with a recesses surface(s) of the bottom wall of the upper reservoir portion 301. Upper reservoir portion 301 is preferably removable simply by lifting it up, but, less preferably, a latch or lock (not shown) may be unlatched or unlocked to allow separation of the two portions 301, 302. If the upper portion 301 is easily liftable off the lower portion, there will be little chance of spilling or splashing liquid out of the reservoir portion 302.

The lower drawer portion 302 may be described as a rectangular box with one drawer 350 that may be used for beverage accessories, utensils, napkins, creamer packets, filters, spoons, straws, sugar packets, etc. The drawer 350 may fill, when closed, the major portion of the interior of the lower portion 302. The lower portion 302 may have feet, pads, or legs on its bottom, for example, for gripping or frictionally engaging the countertop, table or other surface upon which it is set. Alternatively, the lower portion may be substantially open at the front end, for example, which allows storage in an interior space of the lower portion, but without a drawer.

Figure 9:
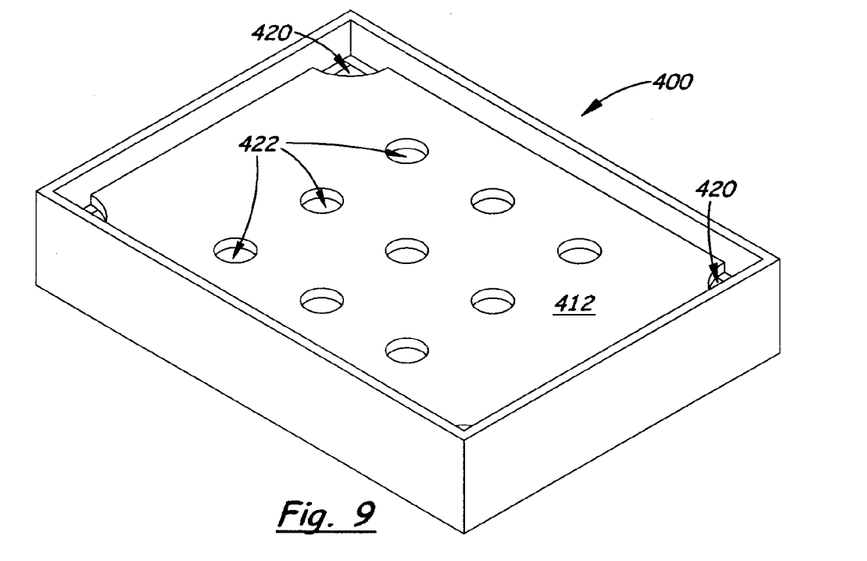
FIG. 9 is an alternative embodiment of the invented platform and container device, wherein the apertures comprise several round holes in the upper platform surface and rounded corner apertures.

FIG. 9 illustrates a device 400 similar to the rectangular devices discussed previously, but with alternative apertures in the platform 412. The corner apertures 420 each have a curved edge, and the apertures 422 near the center of the device are round holes. This figure illustrates alternative apertures, but it will understood that other shapes and sizes of apertures may be used, including other shapes of apertures at or near the center of the platform (such as triangular, polygonal including square, rectangular and hexagon), apertures of various shapes in the region between the center of the platform and the outer perimeter of the platform (circular, slit, elongated, curved, polygon, for example), and other shapes and/or numbers of apertures at or near the corners (circular, slit, elongated, curved, polygon, for example).

Figure 10:
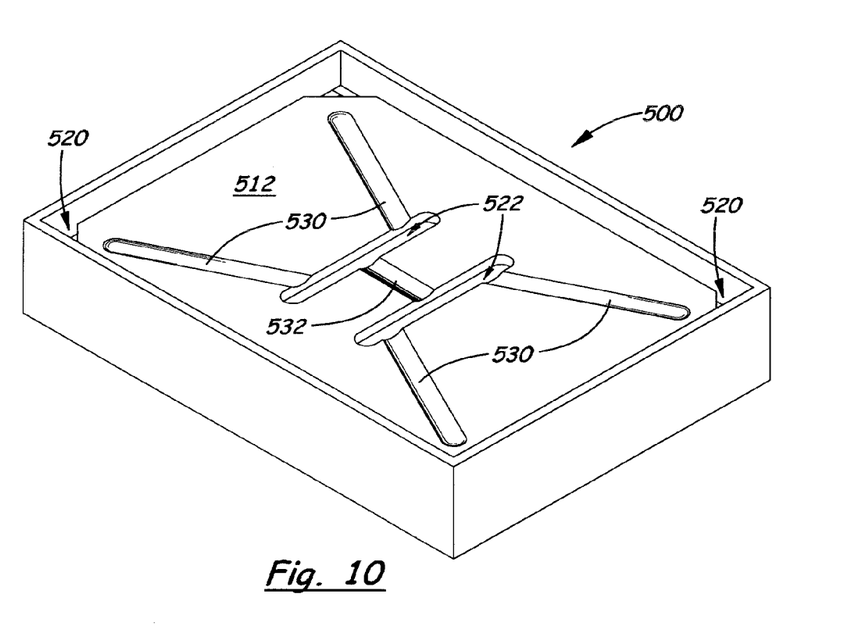
FIG. 10 is an alternative embodiment of the invented platform and container device, wherein the slit-apertures are near the center of the platform and grooves/troughs are provide to help direct overflow liquid to the slit-apertures. The groove/troughs are recesses, rather than apertures, and therefore do not extend all the way through the platform wall.

FIG. 10 illustrates one of several ways the platform may be topographically structured, curved or adapted to help guide/direct the overflowing liquid into the apertures. FIG. 10 shows an embodiment of the device 500 that has corner apertures 520 as discussed above, plus two slit-style apertures 522 near the center of the platform. These apertures 520 522, as in the other holes/openings called "apertures" herein, go all the way through the platform, wall, to fluidly communicate with the interior reservoir space. In addition, this device 500 illustrates one, but not the only, embodiment of grooves 530 that extend across the platform preferably from different directions to collect liquid and then "empty" into the apertures 522. This grooves 530, and the groove 532 connecting the two apertures 522, are elongated recesses that will tend to act as receivers of the overflowing liquid, and to direct the liquid by virtue of the inner ends connecting, without obstacle or barrier to liquid flow, with apertures 522. For example, the edges of the apertures should be flush with the surrounding platform surface, rather then having raised edges. These grooves 530, 532 may assist gravity flow into the apertures.

The grooves may also be provided to direct flow into the corner apertures, but virtue of being recessed and connecting, without obstacles or barrier to liquid flow, to the corner apertures. The grooves leading to one or more apertures, including the central apertures and/or the corner apertures, may be beneficial in directing flow, while not increasing the percentage of apertures (openings, holes) in the platform, as an adaptation to prevent splashing and spilling during carrying and emptying the device. The grooves may have bottom-most surfaces that are slanted toward the apertures, to further encourage flow of overflow water by gravity to the apertures. This slanting may be minimal, for example, 1-5 millimeters drop from the highest end of the bottom surface of each groove to the edge of its respective aperture(s).

Figure 11:
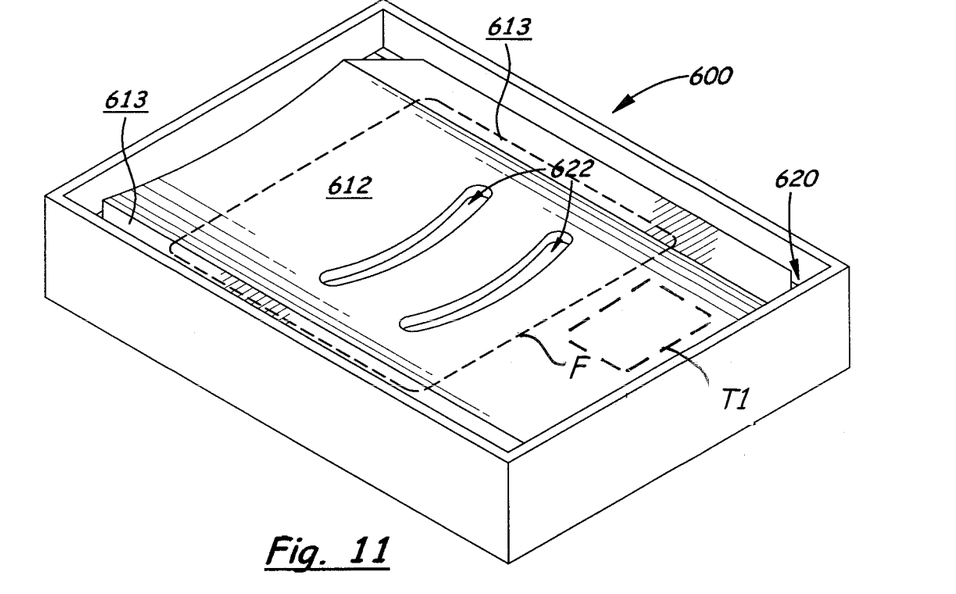
FIG. 11 is an alternative embodiment of the invented platform and container device, wherein the slit-apertures are near the center of the platform and the platform has a concave region to help direct overflow liquid to the slit-apertures.

FIG. 11 illustrates an embodiment of the device 600 wherein the platform 612 corner apertures 620 plus a large region that is concave for draining overflow liquid to the apertures 622 at or near the center of the platform. The platform has right and left horizontal, "flat" strips 613, with the platform surface between these strips being concave so that the lowest portion of the platform in along the longitudinal centerline between the front and the rear of the device. This, the small appliance may rest on the platform, mainly or entirely on the horizontal strips 613 (which will be preferably parallel to the table or countertop surface on which the device rests), but there is a concave surface underneath the appliance that will be efficient in catching and directing the overflow liquid to the apertures 622. Note the footprint F of the appliance in dashed lines on the platform, wherein the platform is much larger than the footprint of the appliance, and the appliance rest on the platform in a stable and safe manner due to the horizontal regions of the platform receiving the base of the appliance. Other portions, including smaller portions, of the platform may be concave (looking from above) or recessed, but with the preferred provision that, if there are multiple concavities/recesses, that they are connected to allow drainage from one to the other and to apertures through the platform.

Figure 12:
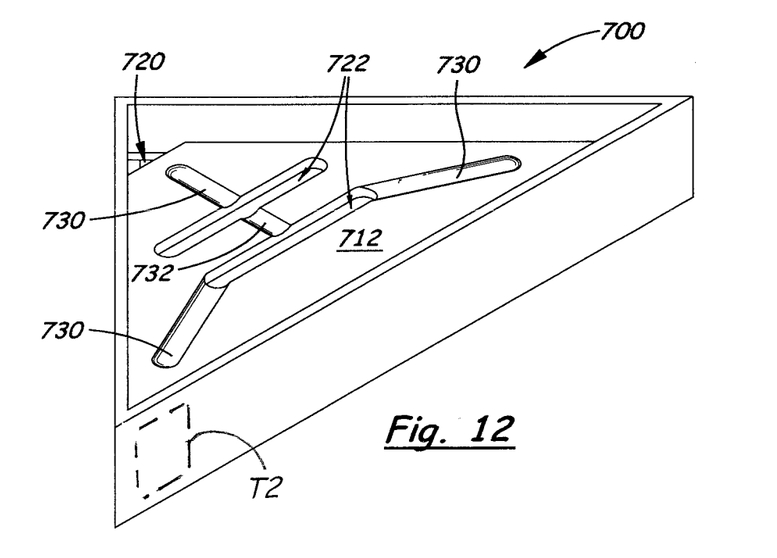
FIG. 12 is an alternative embodiment of the invented platform and container device, wherein the triangular platform has grooves/troughs connecting to the apertures near the center of the platform to help direct overflow liquid.

FIG. 12 illustrates another embodiment of the device 700 that includes a platform 712 with corner apertures 720 and also slit-style apertures 722, plus grooves 730 leading to the apertures 722 and a groove 732 between the apertures 722. Note that, in this embodiment, one might extend the grooves 730 to fluidly communicate with the corner apertures 720 also, so the grooves could direct fluid to all apertures.

FIGS. 11 and 12 also illustrate some, but not the only, embodiments of transparent portions that may allow the user to see the level of liquid in the reservoir. For example, transparent or translucent portion T1, in dashed lines, allows the user to see into the FIG. 11 reservoir to see or estimate how full the reservoir is. Alternatively, transparent or translucent portion T2 in FIG. 12, in dashed lines, is an alternative approach, wherein a portion of a side wall of the reservoir allows the user to see or estimate how full the reservoir is. Alternatively, other "sight glass" features or means may be used, including larger portions of the device, or the entire device, being transparent or translucent. The device may be made of many different materials, therefore, including opaque, transparent, translucent, and a mixture of these, including plastics, metals, and composites.

Figure 13:
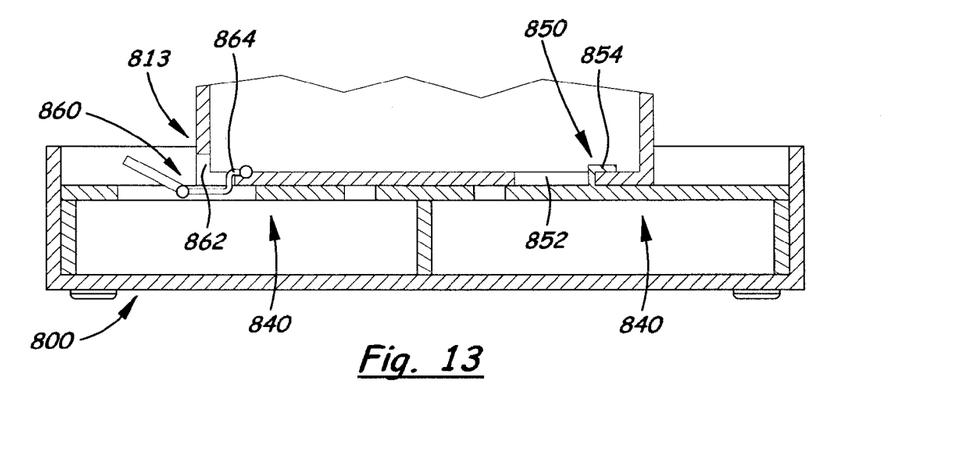
FIGS. 13 and 14 are cross-sectional views of an alternative embodiment of the invented platform and container device, with a small appliance attached by a sliding connection and pivoting latch system. This connection system is one, but not the only, embodiment of a device according to the invention that may be sold as a portion of the small appliance, but may be removed for emptying.
Figure 14:
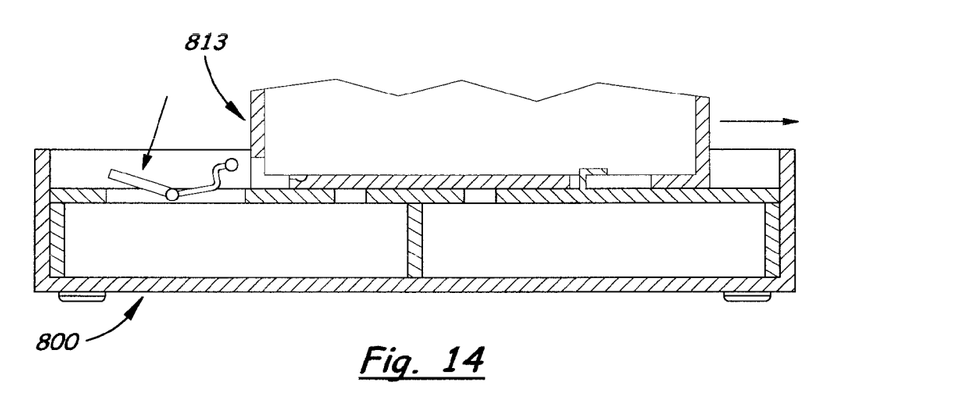

FIGS. 13 and 14 illustrate one, but not the only, embodiments of the device 800 that is sold with a small appliance 813, as a connected but removable portion of the appliance. The device 800 and appliance 813, for example a coffee maker, may be connected to each other for use until the device 800 needs to be emptied. One may see an embodiment of a connection between the two, in FIGS. 13 and 14, which comprises connection at two locations between the device and the appliance. The front connection 850 comprises a hook 854 extending up from the platform and being received in an aperture or recess 852 in the bottom surface of the base of the appliance. The hook 854 extends over an edge of the bottom wall of said base. The rear connection 860 comprises a pivotal latch with a latch end 864 that extends through an apertures/recess 862 in the base and that hooks over an edge of the base bottom wall. Thus, one may see the latched configuration in FIG. 13, wherein both the hook 854 and the latch end 864 (which may also be called a "hook") are positioned to hold the base of the appliance and the device tightly together. This way, the appliance and platform/container device may be sold, used, and moved as a single unit. If liquid overflows, spills or drips, the latch 860 may be unlatched and the appliance may be slid off of the platform/container device, as shown in FIG. 14. The aperture/recess 852 is large enough to allow the sliding and then lifting of the appliance up off of the platform. Other latches, snap-connections, hooks and connection mechanisms may be used to temporarily connect the appliance to the device.

Other views of the embodiments in the drawings may be understood from the drawings and from the following comments. While not all the embodiments need to be symmetrical, the embodiments shown are preferably symmetrical about their longitudinal vertical plane (from front to rear, along the centerline). So, while not all sides are shown, the right and left sides may be understood to be mirror-images. The bottom surfaces of the embodiments in the drawings are typically flat, planar, and solid (continuous), with feet added at or near the corners, but other bottom surfaces may be effective, for example, with recesses or texture for strength, but preferably no apertures, holes for screws or rivets, or seams that could cause leaks. The upper reservoir portion of the embodiment of FIG. 8 is the same as that in FIGS. 1-5, except that the rectangular bottom surface (not shown), about ½-1 inch inside of the sidewall, is slightly/shallowly recessed to mate with the rectangular upper surface (not shown) of the lower drawer portion that, inside the sidewall a corresponding ½-1 inch, is slightly raised so that the upper and lower stacking portions may mate without easily sliding off of one another.

Some embodiments may be described as: a liquid-overflow platform and container device for capturing liquid overflowing from a small appliance, the device comprising: an upper platform surface having a surface area, the platform surface being for receiving the small appliance, said platform surface having apertures that, in total, are 1-10 percent of the surface area, said apertures comprising at least one aperture at an outer corner of said upper platform surface; a container underneath and connected to the upper platform, said container having an interior reservoir space for receiving liquid draining from the upper platform surface through said apertures. The device may be rectangular, wherein said apertures comprise a corner aperture in at least two of the four corners of the platform. The device may further comprise multiple central apertures at or near the center of the platform. The platform is preferably not a screen, mesh plate, or a grate with, for example, greater than 20 apertures. Preferably, the apertures in the platform total only 2-10 apertures. Some central apertures are elongated slit apertures. Grooves in the platform upper surface may be present to fluidly communicate with the apertures to direct liquid to said apertures. At least one of the grooves, if present, may be elongated and have a closed bottom that slants downward toward an aperture to which the groove connects. The platform may comprise at least one concave region for draining overflow liquid into said apertures, for example, a bowl or other slanted portion, as long as the small appliance may rest on the platform in a stable and safe manner.

Some embodiments may comprise a combination of a coffee maker and a liquid-overflow platform and container device for capturing liquid overflowing from the coffee maker, the coffee maker having a base that is the lowermost portion of the coffee maker, wherein the base has a bottom surface with a base surface area, and wherein the platform and container comprises: a upper platform having an outer perimeter and a surface area, said platform having 2-10 apertures that, in total, are 1-10 percent of the surface area, said apertures comprising at least one aperture at a corner of said outer perimeter of said upper platform surface; a container underneath and connected to the upper platform, said container having an interior reservoir space; wherein the coffee maker base rests on said upper platform, and liquid overflowing from said coffee maker falls on said upper platform, and flows through said apertures into said interior reservoir space; and wherein the surface area of said upper platform is 20-150 percent larger than said base surface area, and said interior reservoir space has a volume 20-150 percent larger than the volume of said overflowing liquid. The relationship of device platform size and coffee maker footprint may vary, but it is desirable in most embodiments to have a relatively large platform for the smaller base of the coffee maker. Also, it is desirable, in most embodiments, to have a large volume in the reservoir compared to the maximum amount of liquid that the coffee maker is designed to process into hot water and/or coffee. For example, said coffee maker may hold 4 cups of liquid maximum and said interior reservoir space may have a volume of 4.8-6 cups. The coffee maker may hold 6 cups of liquid maximum and said interior reservoir space may have a volume of 7.2-9 cups. The coffee maker may hold 8 cups of liquid maximum and said interior reservoir space may have a volume of 9.6-12 cups. The coffee maker may hold 10 cups of liquid maximum and said interior reservoir space may have a volume of 12-15 cups. Said coffee maker may be removably latched to the platform and container device.

Although this invention has been described above with reference to particular means, materials and embodiments, it is to be understood that the invention is not limited to these disclosed particulars, but extends instead to all equivalents within the scope of the following claims.

We claim:

1. A liquid container for capturing small-appliance-liquid accidentally flowing from a small appliance due to malfunction, breakage, or cracks in the small appliance, the container comprising:
   walls surrounding and defining an interior reservoir space, the walls including a bottom wall, a sidewall having an outer surface, an inner surface, and a top surface, and an upper platform secured to the container for holding the small appliance;
   wherein the upper platform has an outer perimeter abutting said inner surface of the sidewall below said top surface, so that the sidewall extends up above the upper platform to form a rim upending all the way around the upper platform to prevent said small-appliance-liquid from spilling off of the container;
   the upper platform having a platform surface area and one or more apertures totaling 1-10 percent of said platform surface area, the one or more apertures in communication with, and conveying said small-appliance-liquid into, the interior reservoir space, wherein the one or more apertures comprises a pour spout aperture, in the outer perimeter of the platform at the inner surface of the sidewall, adapted for pouring said small-appliance-liquid from the interior reservoir space out of the container without removing the upper platform from the container.

2. A container as in claim 1, wherein the upper platform is permanently affixed to the container and the outer perimeter is liquid-sealed to the sidewall except at the pour spout aperture.

3. A container as in claim 1, wherein the upper platform comprises multiple of said pour spout apertures in the perimeter of the platform at the upending rim and wherein the upper platform is permanently affixed to the container and the outer perimeter is liquid-sealed to the sidewall except at the pour spout apertures.

4. A liquid container for capturing small-appliance-liquid accidentally flowing from a small appliance due to malfunction, breakage, or cracks in the small appliance, the container comprising:
   walls surrounding and defining an interior reservoir space, the walls including a bottom wall, a sidewall having an outer surface, an inner surface, and a top surface, and an upper platform secured to the container for holding the small appliance;
   wherein the upper platform has an outer perimeter abutting the inner surface of said sidewall below the top surface, so that the sidewall extends up above the upper platform to form a rim upending all the way around the upper platform to prevent said small-appliance-liquid from flowing off of the container;
   the upper platform having a platform surface area and one or more apertures in communication with, and conveying said small-appliance-liquid into, the interior reservoir space, wherein the one or more apertures comprise one or more pour spout apertures, in the outer perimeter of the platform at the inner surface of the sidewall, adapted for pouring said small-appliance-liquid from the interior reservoir space out of the container without removing the upper platform from the container;
   wherein the upper platform is permanently affixed to the container and the outer perimeter is liquid-sealed to the sidewall except at the one or more pour spout apertures for preventing fluid spills during carrying of the container to a liquid-disposal location.

5. A combination of a coffee maker and a container for capturing hot liquid overflowing from the coffee maker, wherein:
   the container comprises walls surrounding and defining an interior reservoir space, the walls including a bottom wall, a sidewall having an outer wall, a top wall, and an inner wall, and a upper platform secured to the container and having a platform surface area and an outer perimeter at said inner wall and below said top wall;
   the coffee maker has a bottom surface with a bottom surface area and removably rests on the upper platform of the container, the coffee maker having a maximum liquid capacity;
   the container being adapted to contain a volume of overflowed liquid greater than said maximum liquid capacity of the coffee maker, and the upper platform being substantially closed, to limit or prevent splashing and spilling during carrying and emptying the liquid out of the container, by means of the upper platform having one or more apertures totaling only 1-10 percent of said platform surface area, wherein the one or more apertures comprise at least one pour spout aperture in the outer perimeter of the upper platform at the inner surface of the sidewall, and by means of the upper platform being liquid-sealed to the inner wall except at said at least one pour spout aperture;
   the one or more apertures being in communication with, and conveying overflowing hot liquid from the coffee maker into, the interior reservoir space, so that the overflowing hot liquid flows onto the upper platform, is prevented by the upending rim from flowing over the sidewall and off of the container, and flows through said one or more apertures into the interior reservoir space; and
   wherein said container is separable from the coffee maker for being carried away to dispose of the hot liquid, without removing the upper platform from the container, by tilting the container to pour the hot liquid out of the at least one pour spout aperture.

6. A method of handling overflow liquid from an accident, malfunction, breakage or crack in a small appliance having a maximum liquid capacity, the method comprising:
   providing a liquid container having walls surrounding and defining an interior reservoir space, the walls including a bottom wall, a sidewall having an outer surface, an inner surface, and a top surface, and a upper platform secured to the container and having an outer perimeter abutting the inner surface of said sidewall below the top surface of the sidewall, so that the sidewall extends up above the upper platform to form a rim, upending all the way around the upper platform, the upper platform having a platform surface area and one or more apertures totaling 1-10 percent of said platform surface area that are in communication with the interior reservoir space, wherein the one or more apertures comprise a pour spout aperture in the outer perimeter of the platform at the inner surface of the sidewall;
   the method further comprising:
   removably placing the small appliance on the upper platform surface of said container, so that liquid overflowing from the small appliance flows onto the upper platform, is prevented from flowing over the sidewall and off of the container by the rim, and flows through the one or more apertures into the interior reservoir space;

removing the small appliance from the container, carrying the container to a disposal site, and, without removing the upper platform from the container, tilting the container to dispose of the overflowing liquid by pouring the overflowing liquid from the interior reservoir space out of the container through the pour spout aperture.

7. A method as in claim 6, wherein the upper platform is permanently affixed to the container and the outer perimeter is liquid-sealed to the sidewall except at the pour spout aperture, and wherein the method comprises all the liquid being disposed of by said pouring through the pour spout aperture without removing the upper platform from the container.

8. A method as in claim 6, wherein the upper platform comprises multiple of said pour spout apertures in the perimeter of the platform at the upending rim and wherein the upper platform is permanently affixed to the container and the outer perimeter is liquid-sealed to the sidewall except at the pour spout apertures.

9. A method as in claim 6, wherein the container comprises no vertical walls inside the interior reservoir space that are a barrier to quick and smooth flow of liquid inside the interior reservoir space to said pour spout aperture for quick and smooth emptying of water out of the reservoir.

10. A method as in claim 6, wherein the container interior reservoir space comprises a center, and the container further comprises a structural support for supporting the upper platform, the structural support being at or near said center and not extending to near the sidewall of the container.

11. A method as in claim 6, wherein the sidewall has at least one corner and the pour spout aperture is at said at least one corner.

12. A method as in claim 6, wherein the container is rectangular and the sidewall has four corners, said one or more apertures comprising a pour spout aperture at each of said four corners.

* * * * *